US007692919B2

(12) United States Patent
Liang et al.

(10) Patent No.: US 7,692,919 B2
(45) Date of Patent: Apr. 6, 2010

(54) NOTEBOOK COMPUTER WITH DETACHABLE DISPLAY UNIT

(75) Inventors: Wei-Kuang Liang, Guangdong (CN); Zhan-Sheng Lu, Guangdong (CN)

(73) Assignees: Hong Fu Jin Precision Industry (Shen Zhen) Co., Ltd., Shenzhein, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 953 days.

(21) Appl. No.: 11/309,145

(22) Filed: Jun. 27, 2006

(65) Prior Publication Data

US 2007/0091552 A1    Apr. 26, 2007

(30) Foreign Application Priority Data

Aug. 12, 2005   (CN) .................. 2005 2 0063116 U

(51) Int. Cl.
G06F 1/16 (2006.01)
(52) U.S. Cl. ................................. 361/679.29
(58) Field of Classification Search ............ 361/679.29
See application file for complete search history.

(56) References Cited

U.S. PATENT DOCUMENTS

| | | | | | |
|---|---|---|---|---|---|
| 4,749,364 | A | * | 6/1988 | Arney et al. ............ | 361/679.27 |
| 5,144,290 | A | * | 9/1992 | Honda et al. ........... | 361/679.26 |
| 5,166,893 | A | * | 11/1992 | Hosoi .................... | 361/679.09 |
| 5,193,069 | A | * | 3/1993 | Furuya .................. | 361/679.09 |
| 5,196,993 | A | * | 3/1993 | Herron et al. .......... | 361/679.29 |
| 5,262,759 | A | * | 11/1993 | Moriconi et al. ....... | 361/679.29 |
| 5,724,704 | A | * | 3/1998 | Seo ....................... | 361/679.27 |
| 5,729,429 | A | * | 3/1998 | Margaritis et al. ..... | 361/679.28 |
| 5,796,576 | A | * | 8/1998 | Kim ...................... | 361/679.28 |
| 6,006,243 | A | * | 12/1999 | Karidis .................. | 361/679.27 |
| 6,163,452 | A | * | 12/2000 | O'Neal et al. .......... | 361/679.27 |
| 6,310,768 | B1 | * | 10/2001 | Kung et al. ............. | 361/679.29 |
| 6,317,315 | B1 | * | 11/2001 | Lee et al. ............... | 361/679.29 |
| 6,373,689 | B1 | * | 4/2002 | Yim ...................... | 361/679.29 |
| 6,445,385 | B1 | * | 9/2002 | Shin et al. .............. | 361/679.29 |
| 6,512,670 | B1 | * | 1/2003 | Boehme et al. ........ | 361/679.29 |
| 6,530,784 | B1 | * | 3/2003 | Yim et al. .............. | 361/679.29 |
| 6,590,547 | B2 | * | 7/2003 | Moriconi et al. ....... | 361/679.29 |
| 6,654,233 | B2 | * | 11/2003 | Tseng et al. ............ | 361/679.27 |
| 6,882,529 | B2 | * | 4/2005 | Helot et al. ............ | 361/679.27 |
| 7,336,480 | B2 | * | 2/2008 | Kwon .................... | 361/679.27 |
| 7,447,005 | B2 | * | 11/2008 | Han ....................... | 361/679.27 |
| 2002/0145846 | A1 | * | 10/2002 | Helot et al. ................. | 361/681 |
| 2006/0256516 | A1 | * | 11/2006 | Cho .......................... | 361/683 |

* cited by examiner

*Primary Examiner*—Lisa Lea-Edmonds
(74) *Attorney, Agent, or Firm*—Winston Hsu

(57) ABSTRACT

A notebook computer with detachable display unit is disclosed. The notebook computer includes a main body, a hinge, and a display unit. The hinge includes an electrical connector, an elastic element, a post, and a pivot shaft. The electrical connector is connected with the elastic element. The post is combined with the pivot shaft. The pivot shaft is assembled on the main body. The display unit defines an opening therein. The display unit includes an electrical connector, an opening, and a locking mechanism. The opening is configured for receiving the post. The electrical connectors of the hinge and the display unit are configured for engaging with each other. The locking mechanism is configured for locking or detaching the connection between the display unit and the main body. The elastic element can reduce the shock that the electrical connectors suffered when the display unit is connected or disconnected to the main unit.

7 Claims, 6 Drawing Sheets

NOTEBOOK COMPUTER WITH DETACHABLE DISPLAY UNIT

FIELD OF THE INVENTION

The present invention relates to a notebook computer, and particularly to a notebook computer having a structure for allowing a display unit to attach to or detach from a main body.

DESCRIPTION OF RELATED ART

Computers are in widespread use, and notebook computers in particular are getting more and more popular because of their portability. Typically, a liquid crystal display (LCD) unit of the notebook computer is fixed to the main body of the notebook computer, however recent developments have seen the introduction of notebook computers with a detachable LCD unit.

For example, U.S. Pat. No. 5,805,415 describes such notebook computer. The display unit has two posts to cooperate with two openings based on a main body, the connection of the posts and the openings are locked by two locking mechanisms based on the display unit. Edge connectors of the display unit and the main body cooperate with each other to electrically connect the display unit and the main body. However, the posts are easy damaged while the display unit is attaches to or detaches from the main body, due to forces acting on the edge connectors. The forces may damage the edge connectors. So what is needed is a notebook computer with a detachable display unit, posts for connecting the display unit and the main body are based on the main body, and the display unit or the main body is connected with electrical connectors by buffering mechanisms.

SUMMARY OF INVENTION

A detachable notebook computer is disclosed. The notebook computer includes a main body, a hinge, and a display unit. The hinge includes an electrical connector, an elastic element, a post, and a pivot shaft. The electrical connector is connected with the elastic element. The post is combined with the pivot shaft. The pivot shaft is assembled on the main body. The display unit defines an opening therein. The display unit includes an electrical connector, and a locking mechanism. The opening is configured for receiving the post. The electrical connectors of the hinge and the display unit are configured for engaging with each other. The locking mechanism is configured for locking or detaching the connection between the display unit and the main body.

Further features of the invention will be described or will become apparent in the course of the following detailed description when read in conjunction with the attached drawings, in which:

DETAILED DESCRIPTION

Figure 1:
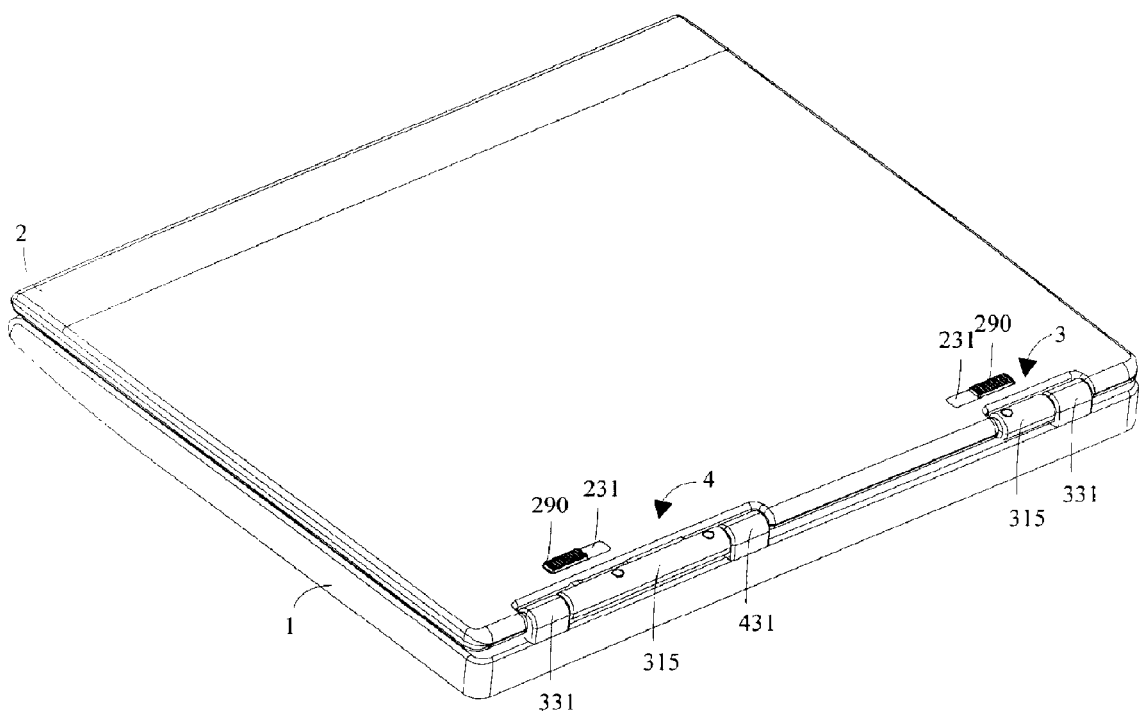
FIG. 1 is a schematic, isometric view of a notebook computer according to a preferred embodiment of the present invention, the notebook computer including a display unit, a main body, and two hinges.
Figure 2:
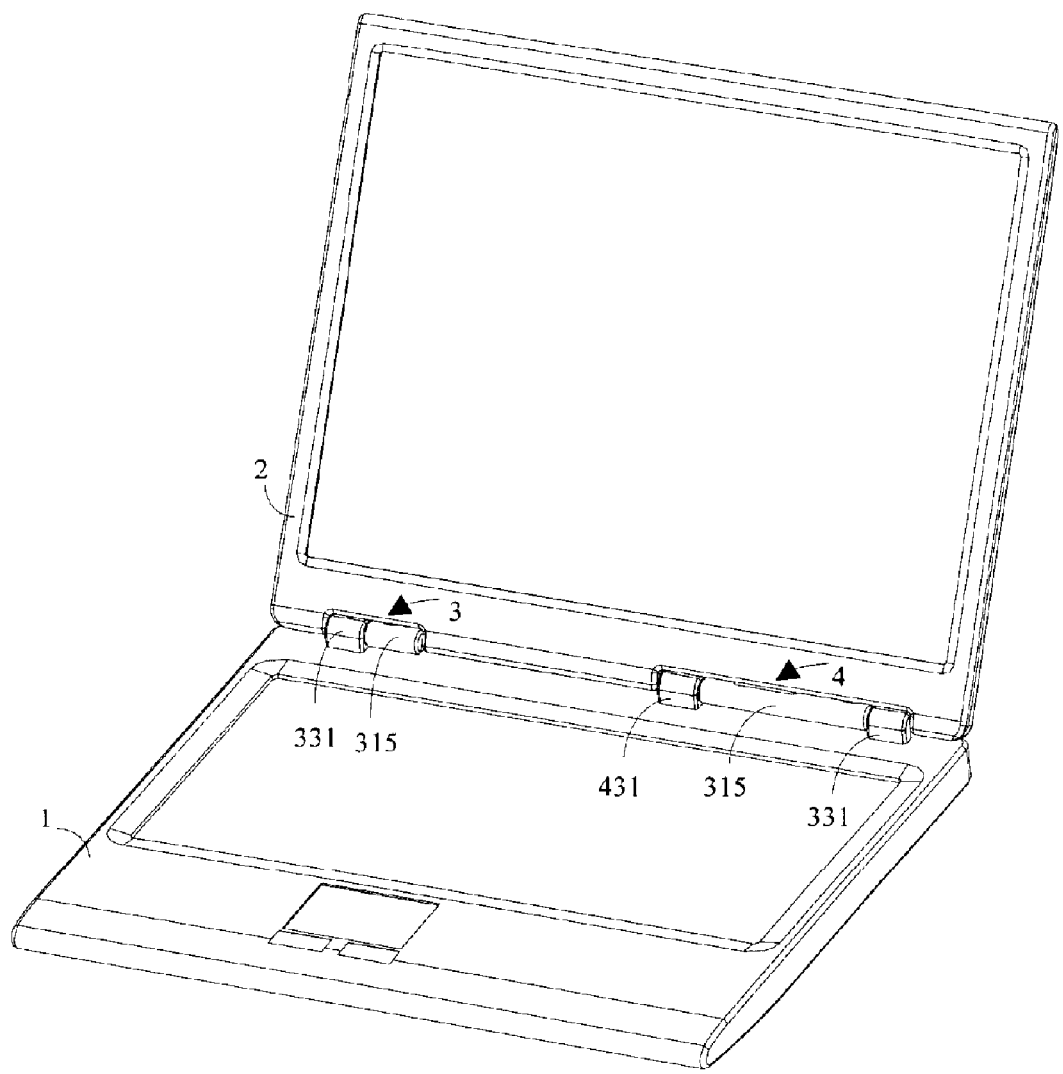
FIG. 2 is a schematic, isometric view of the notebook computer of FIG. 1, the display unit is opened relative to the main body.

Referring to FIGS. 1 and 2, a detachable notebook computer in accordance with a preferred embodiment of the present invention is shown. The notebook computer includes a main body 1, a display unit 2, and hinges 3 and 4.

Referring to FIGS. 3, 4, 5, and 6, each of the hinges 3 and 4 includes a pivot shaft 311, a post 312, two hinge covers 314 and 315, and two caps 331. The pivot shaft 311 is fitted on the main body 1 and received in a vessel formed by the two hinge covers 314 and 315. The post 312 is rotationally connected with the pivot shaft 311 and passes through the vessel formed by the two hinge covers 314 and 315. The post 312 defines a groove 313. The hinge caps 331 cover a connection part of the pivot shaft 311 and the main body 1. The hinge caps 431 cover an end of the vessel formed by the hinge covers 314 and 315 of the hinge 4.

Figure 3:
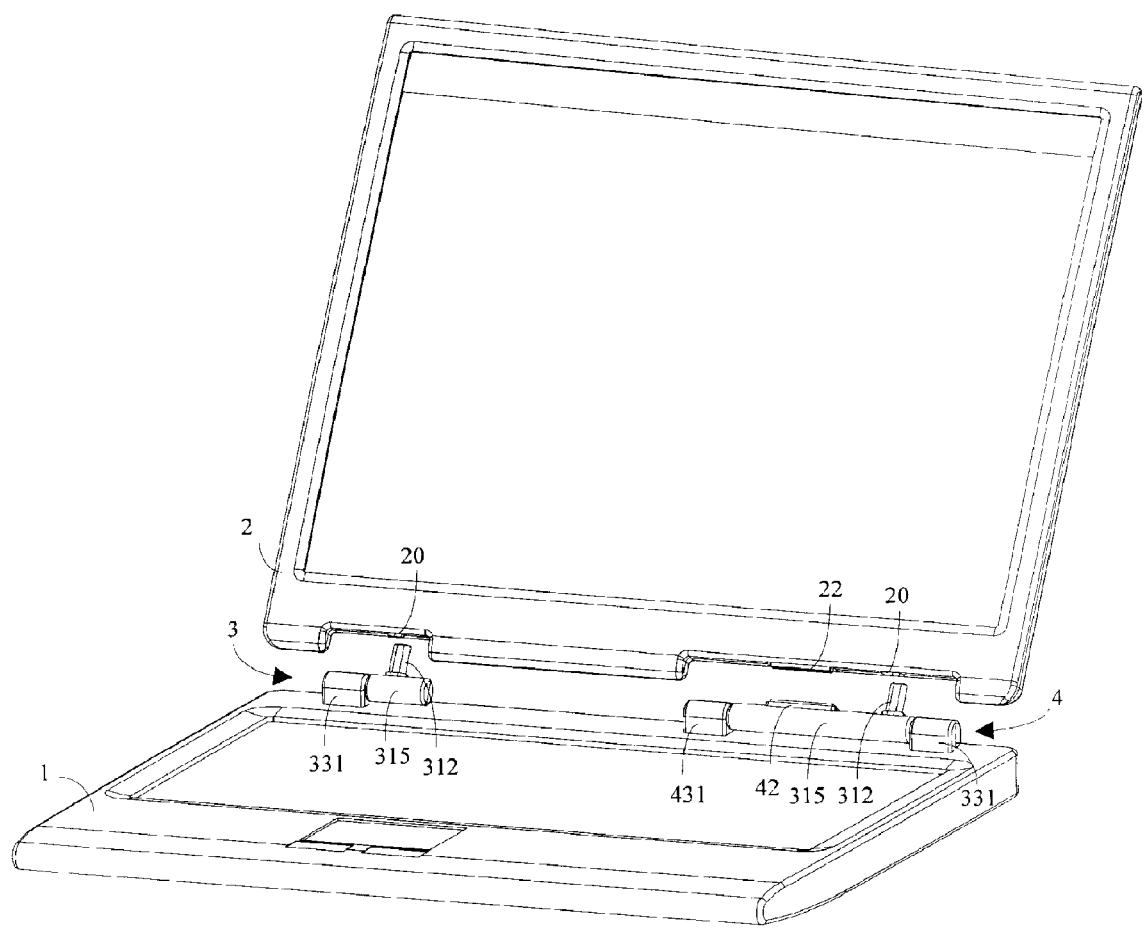
FIG. 3 is a schematic, isometric view of the notebook computer of FIG. 1, the display unit is separated from the main body.
Figure 4:
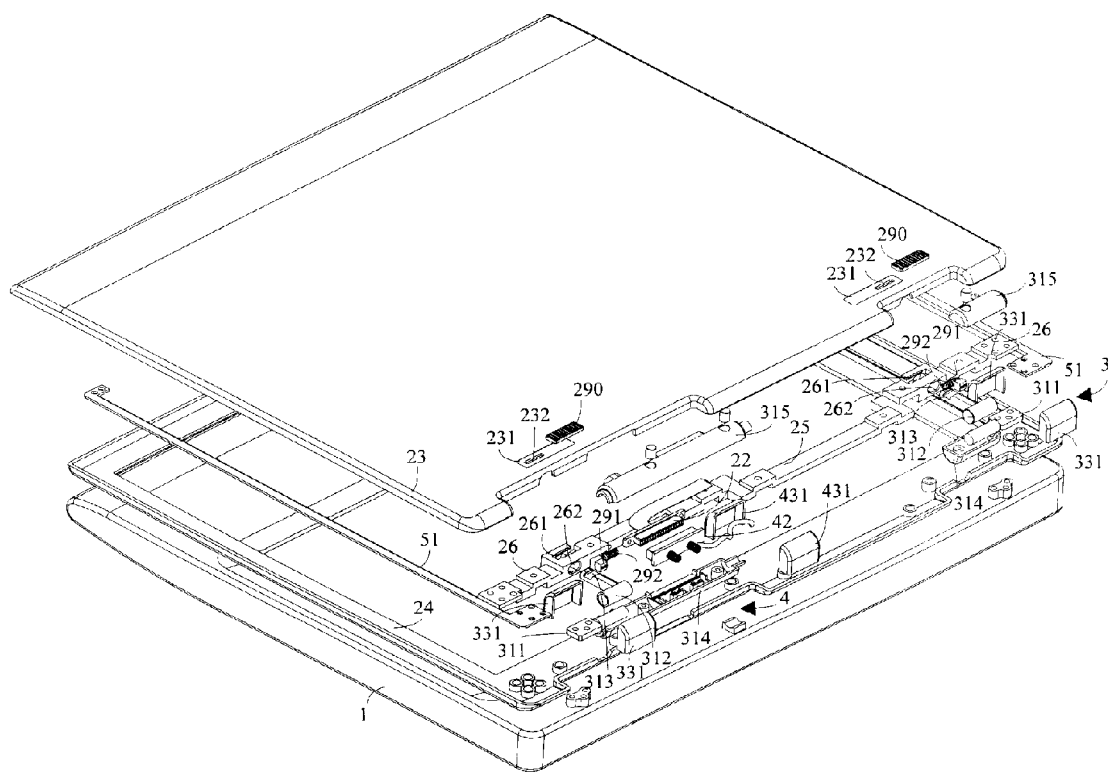
FIG. 4 is an exploded view of the notebook computer of FIG. 1.
Figure 5:
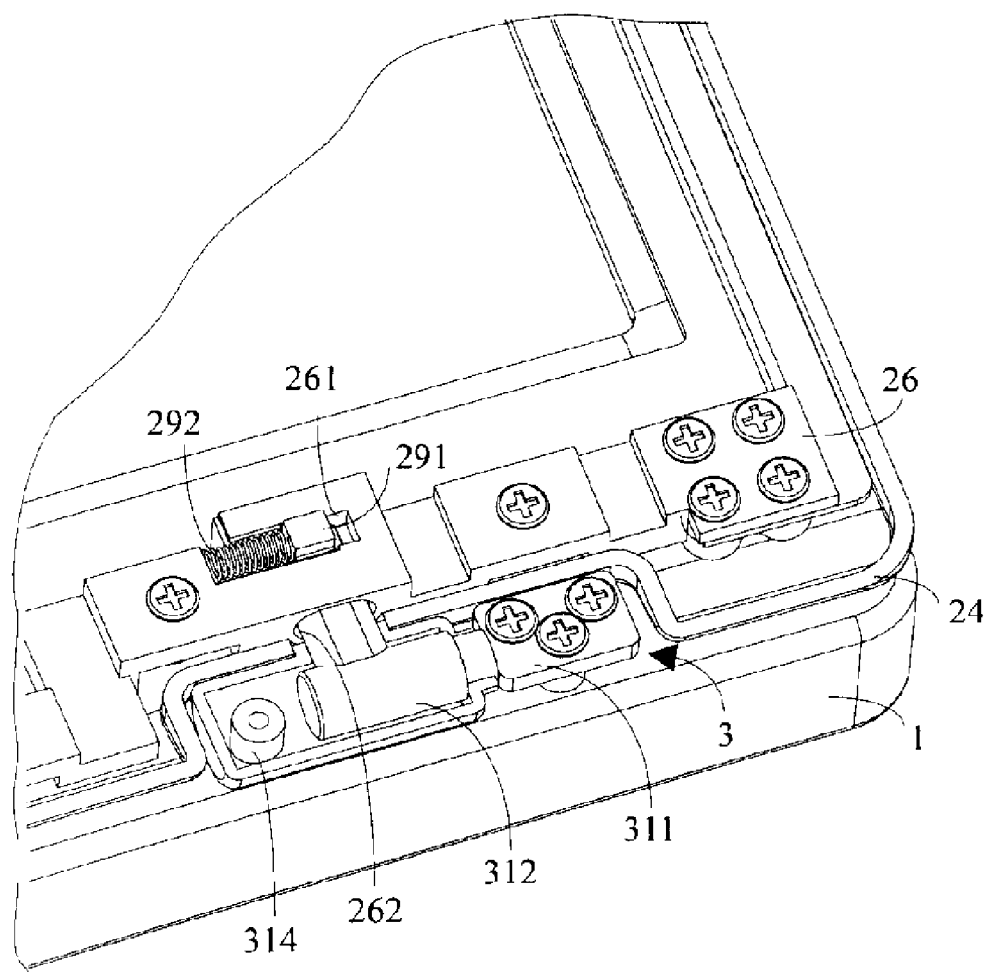
FIG. 5 is a schematic, isometric view showing how the hinge without an electrical connector is connected with the display unit.

Referring to FIGS. 3 and 4, the display unit 2 includes a top 23, a bottom 24, two side frames 51, two end frames 26, and a middle frame 25. The side frames 51, the end frames 26, and the middle frame 25 are connected correspondingly to form a frame for supporting the display unit 2. The top 23 defines two grooves 231 and two through openings 232. Each end frame 26 defines an opening 262 to receive the post 312. Furthermore, each end frame 26 defines a groove 261 leading to the opening 262.

The detachable notebook computer further includes two locking mechanisms to lock or detach the connection between the display unit 2 and the main body 1. Each locking mechanism includes a locking key 290, a locking piece 291, and a spring 292. The locking key 290 is firmly connected with the locking piece 291 and received in the groove 231 as well as the locking piece 291. The locking piece 291 is also received in the through opening 232, and further connects to the end frame 26 through the spring 292. The locking piece 291 engages with the groove 313 when the post 312 is in the opening 262.

Figure 6:
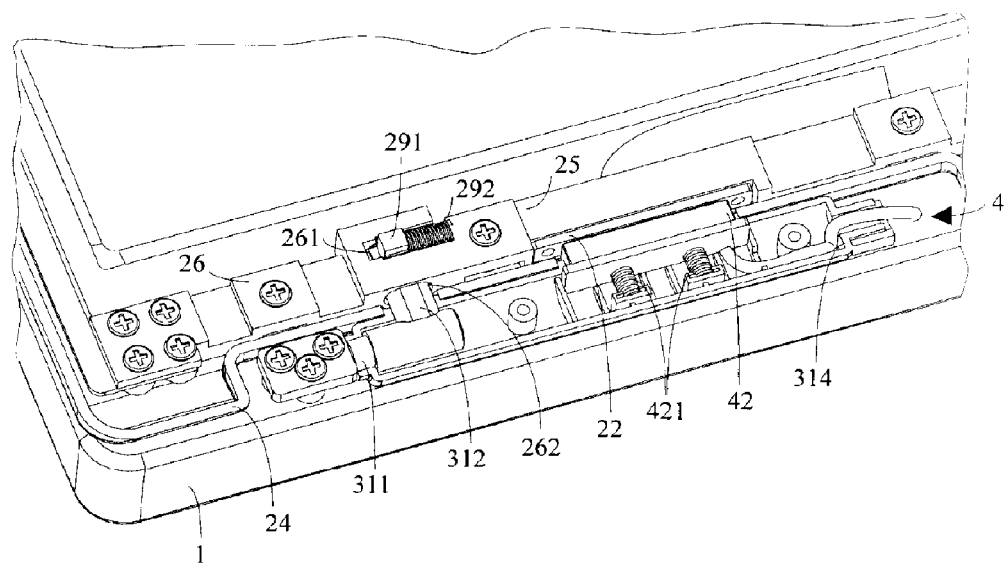
FIG. 6 is a schematic, isometric view showing how the hinge with a electrical connector is connected with the display unit.

Referring to FIGS. 4 and 6, an electrical connector 42 is assembled in the vessel formed by the hinge covers 314 and 315 of the hinge 4, and an electronic connector 22 is assembled on the middle frame 25. Furthermore, the electrical connector 42 is connected to the hinge cover 314 through two elastic elements 421.

To assemble the display unit 2 on the main body 1, firstly the two locking keys 290 are moved toward each other, thereby simultaneously moving the locking pieces 291 connected therewith. As a result, the springs 292 are connected therewith the locking pieces 291 are compressed, the posts 312 are inserted into the corresponding openings 262, and the electrical connector 42 is connected to the electrical connector 22. Due to an elasticity property of the springs 292, each spring 292 correspondingly pushes the locking keys 290 away therefrom to return to their initial forms, and thus the locking pieces 291 connected therewith are impelled to engage with grooves 313, resulting in the display unit 2 being connected to the main body 1. Moreover, the display unit 2 can then be pivotally folded into an opened and a closed position relative to the main body 1. Conversely, it is apparent that reverse steps can be used to separate the display unit 2 out from the main body 1, therefore, for simplicity, the description of the inverse steps is omitted herein.

In assembling or separating the display unit 2 on or from the main body 1, the electrical connectors 22 and 42 are subjected to shock. The elastic elements 421 can be elongated or compressed to absorb the shock. The connection between the electrical connectors 22 and 42 may be also loosened by shock causing disconnections, in such a case the elastic elements 421 can act as a means to reaffirm the connection.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A notebook computer comprising:
a main body;
a first hinge, the first hinge comprising an electrical connector, an elastic element, a post, and a pivot shaft, wherein the electrical connector is mounted on the elastic element, the post is combined with the pivot shaft, and the pivot shaft is assembled on the main body; and
a display unit defining a first opening therein, the display unit comprising:
an electrical connector; and
a first locking mechanism;
wherein the first opening is configured for receiving the post, the electrical connectors of the hinge and the display unit are configured for engaging with each other, and the first locking mechanism is configured for locking or detaching a connection between the display unit and the main body.

2. The notebook computer of claim 1, further comprising a second hinge, the second hinge comprising a post and a pivot shaft, wherein the post is combined with the pivot shaft, and the pivot shaft is assembled on the main body.

3. The notebook computer of claim 2, wherein the display unit defines a second opening for receiving the post of the second hinge.

4. The notebook computer of claim 3, wherein the display unit further comprises a second locking mechanism for locking or loosening the connection between the display unit and the main body.

5. The notebook computer of claim 4, wherein the second locking mechanism comprises a locking key, a locking piece connected with the locking key, and a spring for connecting the locking piece to the display unit.

6. The notebook computer of claim 1, wherein the first locking mechanism comprises a locking key, a locking piece connected with the locking key, and a spring for connecting the locking piece to the display unit.

7. The notebook computer of claim 6, wherein each post forms a groove thereon to cooperate with the locking piece.

* * * * *